Figure 1:
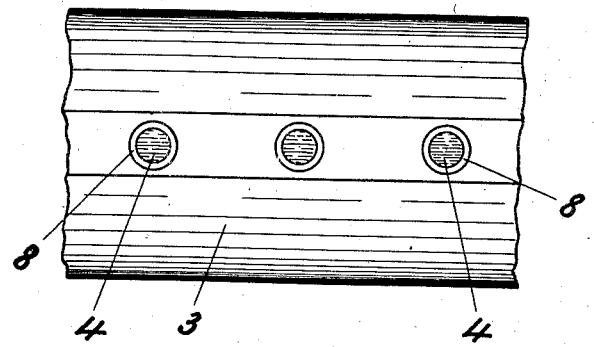

Nov. 10, 1942.  M. MÜCKLICH  2,301,569
STUDDED MOTOR VEHICLE TIRE
Filed June 20, 1939

Inventor:
Max Mücklich

Patented Nov. 10, 1942

2,301,569

UNITED STATES PATENT OFFICE 2,301,569

STUDDED MOTOR VEHICLE TIRE

Max Mücklich, Dresden, Germany; vested in the Alien Property Custodian

Application June 20, 1939, Serial No. 280,093
In Germany June 28, 1938

2 Claims. (Cl. 152—210)

This invention relates to tires for motor vehicles with protective and antiskid studs vulcanized in the rubber layer forming the tread and to an improved construction and arrangement therefor.

In the known tires of this type the studs in shape of a mushroom with inwardly directed head constructed as a hollow cone are embedded in the binding layer provided above the linen insert, and further the stem or stud shank is rigidly surrounded by the rubber layer forming the tread. The studs sit firmly in the binding and tread layer, whereas the shank projects very slightly from the tread.

It has been found that this type of arrangement and construction of the antiskid studs possesses various objections.

On the one hand they lose their gripping capacity after a relatively short time, because they wear quicker than the tread surface surrounding them. If they are allowed to project a considerable amount at first, the road surface is considerably damaged when free from snow and ice.

If they are arranged so that they do not damage the road surface, they are efficient only for a correspondingly shorter period and in the case of snow-covered or iced roads are not efficient at all.

Another objection is the fact that such metal studs become strongly heated so that the surrounding rubber layer becomes brittle and the studs lose their hold thereby reducing the life of the tire.

According to the invention the studs are anchored in such a manner that the head is embedded in the binding layer as heretofore, but the shank extends substantially free in a cylindrical radial recess in the tread. As this recess is of larger diameter than the shank, a sleeve-like air wall is formed around the shank. This air wall serves two purposes, namely, primarily for inserting a sleeve or tube length which, after clamping abutment, projects beyond the end of the shank and consequently beyond the tire surface, the sharp edges of the tube producing the best possible antiskidding effect. When tube lengths are used, an annular shoulder may be advantageously formed therein, which shoulder forms an abutment which bears against the end of the stud shank when the tube comes in contact with the road.

If this strong antiskidding effect is not necessary, for example when travelling on roads free from snow and ice, the tube lengths can be loosened and removed, just as easily and quickly as they are fitted, by means of a sharp blow on a mandrel placed on the end face of the shank.

However, the antiskidding effect of this stud without the sleeve or tube length is also superior to that of the known studs, as, owing to the possibility of the shank tilting in the recess, the sharp edges, even when they project only slightly, engage when the tire skids, whereas when the tire rolls in the normal way the ends of the shanks bear flat on the ground.

At the same time the sleeve-like air wall prevents the shank from becoming too strongly heated and effects a protection of the tread.

Consequently the recesses have nothing in common with the known recesses which are constructed to receive counter-sunk plates or other gripping elements which are secured to bolts or the like embedded in the rubber.

The studs and tube lengths may be made of any suitable material.

Figure 2:
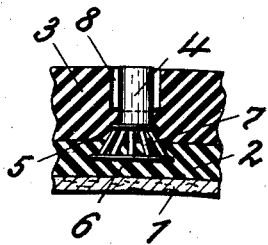
Figure 3:
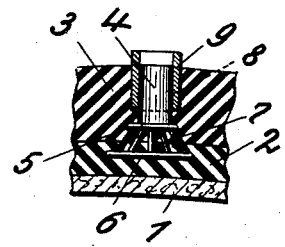
Figure 4:
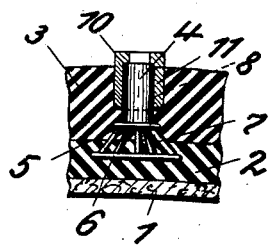

Several embodiments of the invention are illustrated by way of example in the accompanying drawing, in which Fig. 1 is a top plan view of a tire section with antiskidding studs embedded therein, Fig. 2 is a part longitudinal section of Fig. 1, Fig. 3 shows a part longitudinal section of a tire but with a tube length set therein, Fig. 4 is a similar longitudinal section but with a shouldered tube length.

The tire, consisting in known manner of a linen layer 1, a rubber binding layer 2, and a rubber layer 3 forming the tread, is made in any desired sectional shape and has in its longitudinal central plane a number of antiskidding studs distributed around its periphery. The studs are in the shape of a mushroom with head directed inwards and consist, according to the invention, of a substantially cylindrical shank 4 connected to the head piece which is formed by a number of straps 7 connecting two rings 5, 6 of different diameters. The head is embedded in the rubber binding and tread layers and gives the studs a firm hold, the straps 7 enabling the studs to yield if the material of the tire is loaded and deformed.

The stud shanks 4 project into cylindrical recesses 8 formed in the material of the tread 3 and having a diameter larger than that of the shanks so that sleeves 9 as shown in Fig. 3 or tube lengths 11 having an inwardly directed step or shoulder 10 as shown in Fig. 4 can be forced on to the ends of the shanks. The recesses 8 can be formed in the rubber tread 3 by arranging sleeves in the vulcanizing mould producing the tire section, which sleeves fit over the stud shanks 7 and press the recesses in the raw rubber. After vulcanizing, these sleeves are removed from the vulcanizing moulds so that a cylindrical air wall is formed around each stud shank. The shanks may be slightly conical in order that the tube length placed on the shank can be jammed when it comes into contact with the road.

The tire may be provided with antiskidding studs in suitable manner in the course of its production or the studs can be fitted subsequently, for example by applying a new protector, on tires which have already been in service.

I claim:

1. An anti-skidding studded tire, especially for motor vehicles, comprising in combination, anti-skidding members constructed in the form of a mushroom and each having a head part embedded in the binding rubber layer of the tire and allowing tilting of the anti-skidding end, a plurality of shanks each standing substantially free in a radial cylindrical recess in the tire tread, said recesses being of larger diameter than the shanks of said members and forming therewith a sleeve-like air wall to allow cooling and tilting of said shanks, a tube length fitted in each of said recesses and clamped on the shank of the corresponding anti-skidding member, each tube length having at its other end an inwardly directed shoulder adapted to form an abutment for the end of the shank of the anti-skidding member which it surrounds.

2. An anti-skidding studded tire, especially for motor vehicles, comprising in combination, anti-skidding members constructed in the form of a mushroom and each having a head part embedded in the binding rubber layer of the tire and allowing tilting of the anti-skidding end, a plurality of shanks each standing substantially free in a radial cylindrical recess in the tire tread, said recesses being of larger diameter than the shanks of said members and forming therewith a sleeve-like air wall to allow cooling and tilting of said shanks, a tube length fitted in each of the recesses and clamped on the shank of the corresponding anti-skidding member, the upper end of the tube length projecting from the tire tread.

MAX MÜCKLICH.